US009649242B2

(12) United States Patent
Chiu et al.

(10) Patent No.: US 9,649,242 B2
(45) Date of Patent: May 16, 2017

(54) WEARABLE SCISSOR-PAIRED CONTROL MOMENT GYROSCOPE (SP-CMG) FOR HUMAN BALANCE ASSIST

(71) Applicant: Honda Motor Co., Ltd., Tokyo (JP)

(72) Inventors: Jimmy Chiu, Sunnyvale, CA (US); Takashi Bannai, Cupertino, CA (US); Ambarish Goswami, Fremont, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 309 days.

(21) Appl. No.: 14/572,554

(22) Filed: Dec. 16, 2014

(65) Prior Publication Data

US 2015/0202113 A1 Jul. 23, 2015

Related U.S. Application Data

(60) Provisional application No. 61/928,499, filed on Jan. 17, 2014.

(51) Int. Cl.
*A61H 3/00* (2006.01)
*G01C 19/02* (2006.01)
*G01C 19/30* (2006.01)

(52) U.S. Cl.
CPC .............. *A61H 3/008* (2013.01); *A61H 3/00* (2013.01); *G01C 19/02* (2013.01); *G01C 19/30* (2013.01); *A61H 2003/007* (2013.01); *A61H 2201/0173* (2013.01); *A61H 2201/0184* (2013.01); *A61H 2201/1215* (2013.01);
(Continued)

(58) Field of Classification Search
CPC ............ A61B 2562/0219; A61H 3/008; A61H 2205/081; A61H 2201/5079; A61H 2201/1215; A61H 2003/007
See application file for complete search history.

(56) References Cited

U.S. PATENT DOCUMENTS

2010/0139440 A1 6/2010 Rhee et al.
2014/0260714 A1* 9/2014 Vallery .................. A61H 3/00
74/5.37

FOREIGN PATENT DOCUMENTS

EP         2514400 A1     10/2012
GB    WO 2013136287 A1 *  9/2013    ........... A61H 1/0274
WO    WO 2013/136287 A1   9/2013

OTHER PUBLICATIONS

Extended European Search Report mailed Apr. 24, 2015 for corresponding European Patent Application No. 15150611.0.
(Continued)

*Primary Examiner* — Terence Boes
(74) *Attorney, Agent, or Firm* — Arent Fox LLP

(57) ABSTRACT

An apparatus for assisting the balance of a user is disclosed herein. The apparatus includes a first control moment gyroscope (CMG) and a second CMG configured as a scissor pair. The first CMG includes a first flywheel and a second flywheel, a first motor that rotates the first and second flywheels, a first gimbal supporting the first and second flywheel, and a first gimbal servo to rotate the first gimbal. The second CMG includes a third flywheel and a forth flywheel, a second motor that rotates the third and fourth flywheels, a second gimbal supporting the third and fourth flywheels, and a second gimbal servo to rotate the second gimbal. The apparatus additionally includes a gyroscope controller controlling the first gimbal servo and the second gimbal servo.

17 Claims, 8 Drawing Sheets

(52) U.S. Cl.
CPC ........... *A61H 2201/1623* (2013.01); *A61H 2201/1652* (2013.01); *A61H 2201/5007* (2013.01); *A61H 2201/5043* (2013.01); *A61H 2201/5058* (2013.01); *A61H 2201/5079* (2013.01); *A61H 2201/5084* (2013.01); *A61H 2203/0406* (2013.01); *A61H 2205/081* (2013.01)

(56) References Cited

OTHER PUBLICATIONS

Li, Dustin et al., "Gyroscopic Assistance for Human Balance", Advanced Motion Control (AMC), 2012 12th IEEE International Workshop On, IEEE, Mar. 25, 2012, pp. 1-6. XP032179498, DOI: 10.1109/AMC.2012.6197144, ISBN: 978-1-45-77-1072-8.

* cited by examiner

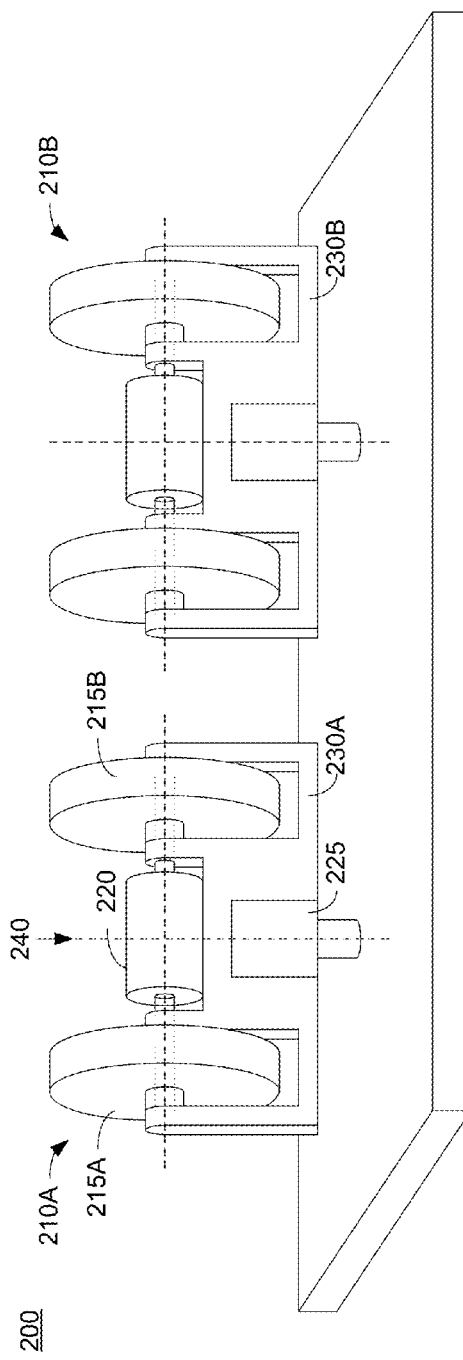
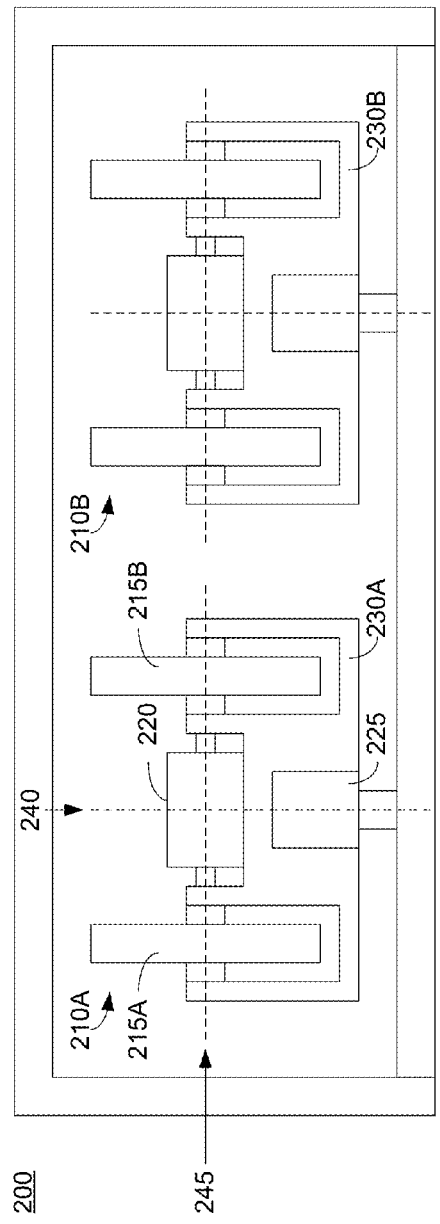
FIG. 2A
FIG. 2B

WEARABLE SCISSOR-PAIRED CONTROL MOMENT GYROSCOPE (SP-CMG) FOR HUMAN BALANCE ASSIST

CROSS REFERENCE TO RELATED APPLICATIONS

This application claims the benefit of U.S. Provisional Application No. 61/928,499, filed Jan. 17, 2014, which is incorporated by reference in its entirety.

BACKGROUND

Reactionless actuators such as control moment gyroscopes (CMGs) and reaction wheels can apply actuation torques through conservation of angular momentum without external forces acting on the body. Such devices can be used in the field of human assistance to provide support or haptic feedback to the wearer without a body to exert an equal and opposite reaction force/torque. For instance, reactionless actuators can be used for assisting the balance of a person wearing the actuator. Current reactionless actuators are not suitable for human wearability due their size, weight, and/or torque output. Thus, there is a need for a reactionless actuator that produces sufficient torque to assist the balance of a user and is suitable for being worn by the user. Other advantages will become apparent from the provided description.

SUMMARY

An apparatus for assisting the balance of a user is disclosed herein. The apparatus includes a first control moment gyroscope (CMG) and a second CMG configured as a scissor pair. The first CMG includes a first flywheel and a second flywheel each structured to rotate about a first axis of rotation through the first and second flywheels, a first motor that when active causes the first and second flywheels to rotate about the first axis of rotation, and a first gimbal having a first shaft and a first support structure supporting the first and second flywheel, the first gimbal structured to rotate the first gimbal about a second axis of rotation through the first shaft, and a first gimbal servo that when active causes the first gimbal to rotate about the second axis of rotation. The second CMG includes a third flywheel and a forth flywheel each structured to rotate about a third axis of rotation through third and fourth flywheels, a second motor that when active causes the third and fourth flywheels to rotate about the third axis of rotation, and a second gimbal having a second shaft and a second support structure supporting the third and fourth flywheels, the second gimbal structured to rotate the second gimbal about a fourth axis of rotation through the second shaft, and a second gimbal servo that when active cause the second gimbal to rotate about the fourth axis of rotation. The apparatus additionally includes a gyroscope controller configured to control the first gimbal servo and the second gimbal servo.

In some embodiments the first and second flywheel are coupled by a third shaft, and the third and fourth flywheels are coupled by a fourth shaft. In one embodiment, the first and second flywheels are coupled by a third shaft, and the third and fourth flywheels are coupled by a fourth shaft. The first angular speed may, for example, be below one fifth of an angular speed at which the flywheels are subject to a strain substantially equal to a strain rating of a material used to fabricate the flywheels.

In some embodiments, the first motor is configured to rotate the first and second flywheel in a first direction, and the second motor is configured to rotate the third and fourth flywheels in a second direction opposite of the first direction. The gyroscope controller may additionally actuate the first gimbal servo in a first direction, and configured to actuate the second gimbal servo in a second direction opposite the first direction.

In some embodiments, the apparatus also includes a sensing module to sense an acceleration of a trunk of a user of the apparatus, and send a signal to the gyroscope controller based on the sensed acceleration, wherein the signal sent by the sensing module to the gyroscope controller is proportional to the sensed acceleration. The gyroscope controller may then actuate the first gimbal in a first direction, and actuate the second gimbal in a second direction responsive to receiving the signal from the sensing module, wherein the angular speed of the first and second gimbals is proportional to the received signal. In one embodiment, the signal sent by the sensing module is sent responsive to the sensed acceleration being larger than a threshold value.

In some embodiments, the apparatus also includes a backplate, wherein the first and second gimbals are substantially perpendicularly coupled to a first surface of the backplate, an enclosure coupled to the back plate, and a harness coupled to a second surface the back plate.

In some embodiments, the first, second, third, and fourth flywheel weigh 900 grams or less and has a radius of 50 mm or less, wherein the apparatus weighs 9 kg or less, and wherein the first and second CMGs produce 25 Nm of torque or more. Furthermore, the first, second, third and fourth flywheels may be made of a tungsten based, high-density alloy and the enclosure may be made of a carbon-Kevlar composite.

In some embodiments, the first flywheel and the second flywheel are equidistant to an axis of rotation of the first gimbal, and the center of mass of the first motor is located on the axis of rotation of the first gimbal. The third flywheel and the fourth flywheel are equidistant to an axis of rotation of the second gimbal, and the center of mass of the second motor is located on the axis of rotation of the second gimbal.

In some embodiments, the rotation of the first gimbal of the SP-CMG and the rotation of the second gimbal of the SP-CMG are controlled independently from each other electronically.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIG. 2A is a diagram of an exemplary scissor-pair control moment gyroscope (SP-CMG) for human balance assist, in accordance with an embodiment.

FIG. 2B is a cross sectional view of the exemplary SP-CMG, in accordance with an embodiment.

Figure 1:
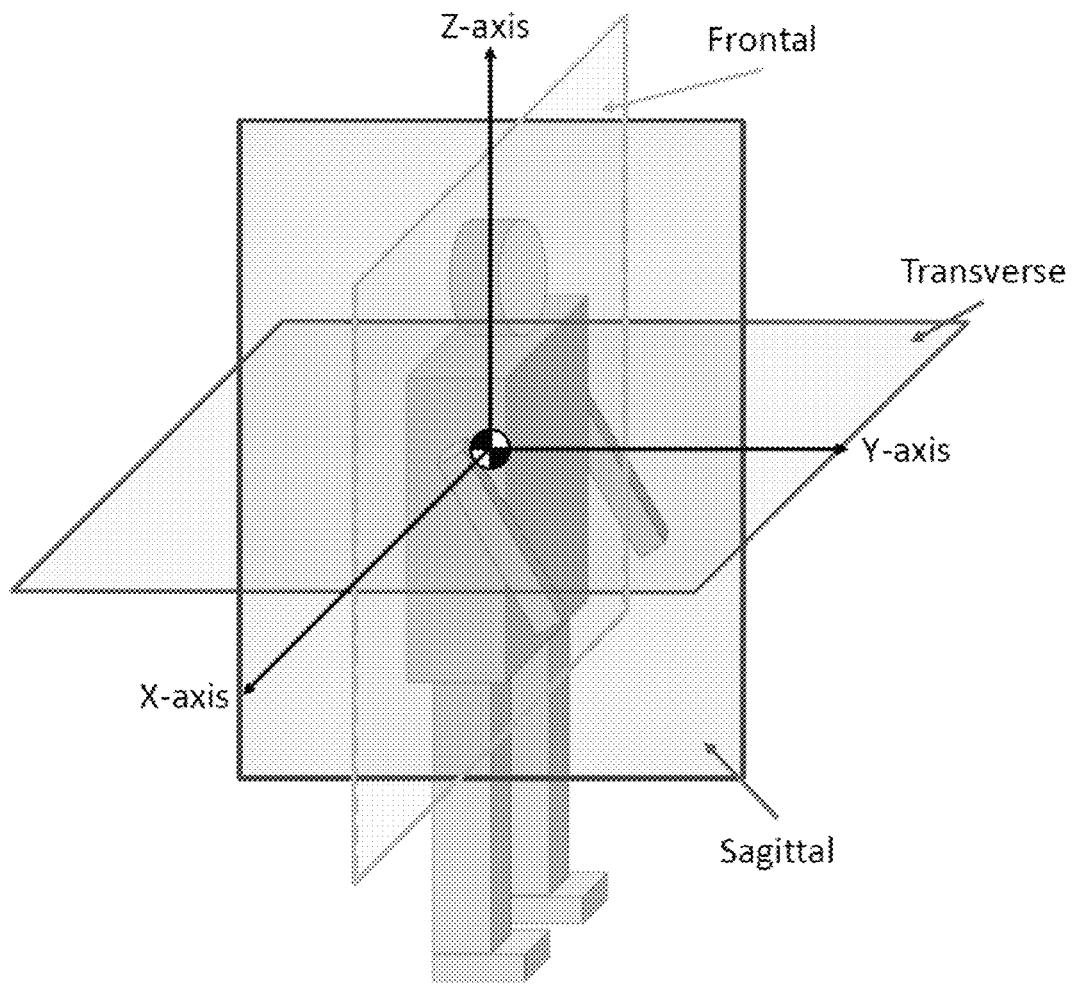
FIG. 1 is an exemplary diagram of different planes of a human body.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION OF EMBODIMENTS

Embodiments are now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may include a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

Overview

Generally described, a scissor-pair control moment gyroscope (SP-CMG) helps a wearer maintain his/her trunk in an upright position and/or assists the wearer in reducing the velocity of a fall when a person loses balance. A user can wear the SP-CMG on their back using a harness or straps. The SP-CMG determines when the trunk of a user deviates from an upright position by at least a threshold amount and/or at least at a threshold angular velocity and applies a torque to restore the postural balance of the user. For instance, the SP-CMG determines whether the user is falling forward or backwards by measuring the acceleration of the user's trunk and applies a torque that generates a force that counteracts the sensed acceleration. Thus, the SP-CMG beneficially aids in preventing the user from falling or dampening the fall of the user.

FIG. 1 is a diagram that illustrates the different planes of a human body. As illustrated in FIG. 1, the human body can be divided into three perpendicular planes. The sagittal plane divides the human body into sinister and dexter (i.e., left and right) portions. The frontal (or coronal) plane divides the human body into dorsal and ventral (i.e., back and front) portions. The transverse plane divides the human body into cranial and caudal (i.e., head and tail) portions.

When a person loses balance, frequently, the loss in balance occurs along the sagittal plane (i.e., the person falls forwards or backwards). To restore balance, a torque in the opposite direction to the change in posture can be applied. In particular, reactionless actuators, such as gyroscopes can be used to generate a torque that is capable of restoring balance of the human body.

A type of reactionless actuator is an inertia wheel. When the inertia wheel is attached to a body, the angular momentum due to a spinning flywheel is exchanged from the spinning wheel to the body. The inertia wheel and the attached body satisfy the conservation of angular momentum, thus, the momentum exchange, or transfer of angular momentum, is done by slowing done the flywheel accelerating the body. The overall angular momentum of the combined system is constant. However, the angular momentum is transferred between both bodies due to acceleration and deceleration of the flywheel.

A control moment gyroscope (CMG) is an inertia wheel mounted on an actuated gimbal. The output torque of a CMG is proportional to both the flywheel angular velocity and the angular velocity of the gimbal. A SP-CMG is a synchronized pair of CMGs which are rotated in opposite directions. Thus, the torques from the two CMGs can add in one plane and can cancel in the other planes.

Figure 2C:
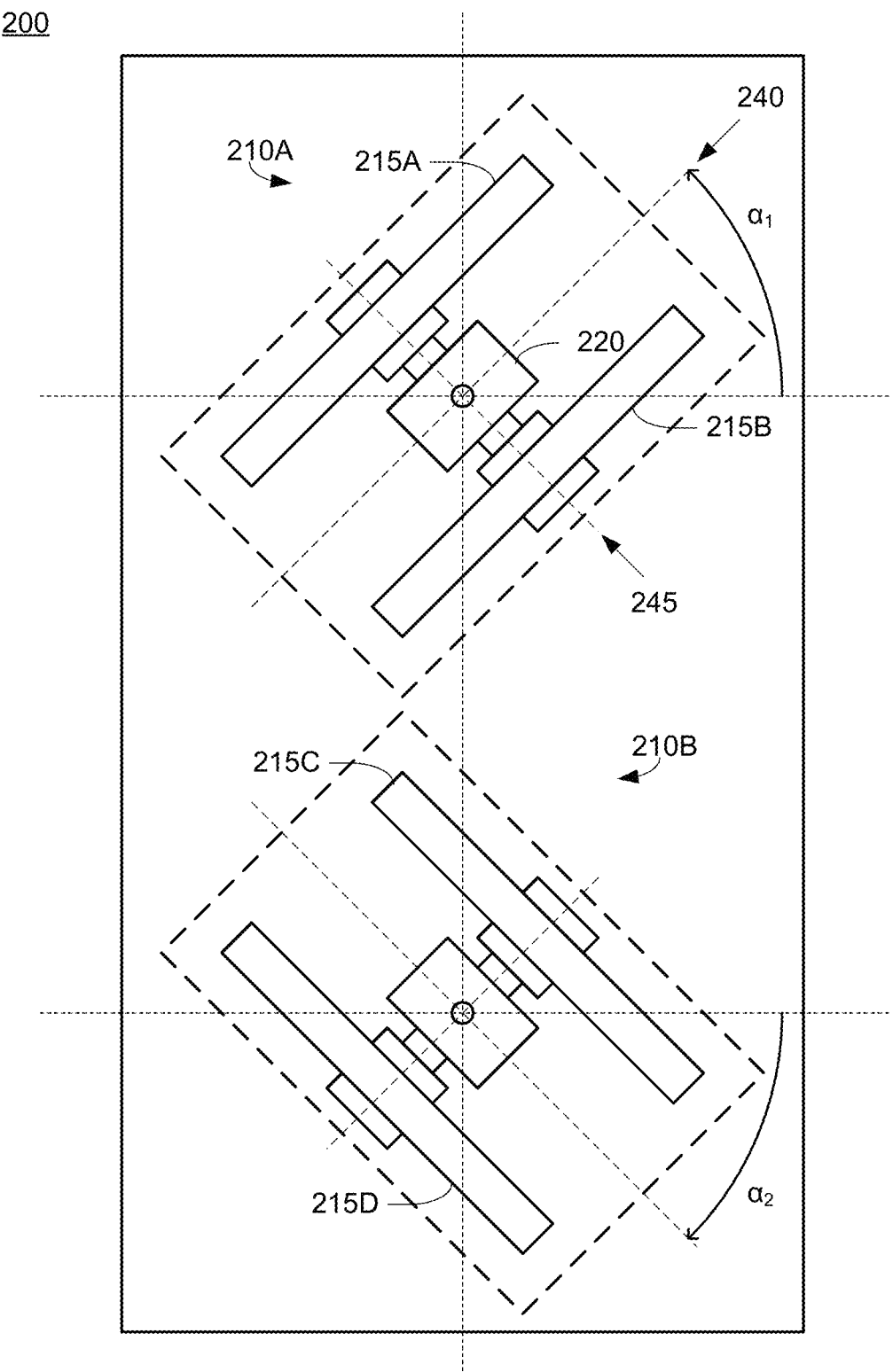
FIG. 2C is a top view of the exemplary SP-CMG, in accordance with an embodiment.

FIG. 2A illustrates a SP-CMG for human balance assist, in accordance with one embodiment. FIG. 2B illustrates a cross sectional view of the SP-CMG, in accordance with an embodiment. FIG. 2C illustrates a top view of the SP-CMG, in accordance with an embodiment.

The SP-CMG 200 includes a first CMG 210A and a second CMG 210B. Each CMG 210 includes a first flywheel 215A, a second flywheel 215B, a flywheel motor 220, a gimbal 230, and a gimbal servo 225. The first flywheel 215A and the second flywheel 215B are located approximately equidistant to the rotational axis 240 of the gimbal 230. The first flywheel 215A and the second flywheel 215B are coupled to the motor 220. The motor 220 is approximately centered around the rotational axis 240 of the gimbal 230. The motor 220 spins the flywheels 210 around rotational axis 245 to store angular momentum in each of the flywheels 210. The flywheels are also attached to the gimbal 230. The gimbal 230 is pivoted around rotational axis 240 and rotates in response to a torque applied by the gimbal servo 225. The use of dual flywheels in each CMG and the symmetry of the CMG 210 allows the CMG 210 to have its center of mass approximately aligned with the rotational axis 240 of the gimbal 230, thus causing undesired forces to cancel out. Furthermore, the use of dual flywheels in each CMG 210 enables the CMGs 210 to generate sufficient force while maintaining a form factor that is well suited for a wearable backpack device. For example, compared to single flywheel CMGs 210 producing similar forces, the dual flywheel design can use flywheels of smaller radius, thereby distributing weight closer to the body and placing less torque on the user.

In some embodiments, the flywheels are of approximately equal mass, size, and/or material. In some embodiment, the first flywheel 215A and the second flywheel 215B are mechanically linked to each other by a first axle so both the first flywheel 215A and the second flywheel 215B rotate with the same angular velocity. The third flywheel 215C and the fourth flywheel 215D are mechanically linked to each other by a second axle so both the third flywheel 215C and the fourth flywheel 215D rotate with the same angular velocity. Each of the first axle and the second axle can be coupled to a different motor. Thus, the angular velocity of the first and second flywheels, and the angular velocity of the third and fourth flywheels can be controlled independently. Alternatively, in one embodiment, the first axle is mechanically coupled to the second axle so that the flywheels 215A, 215B, 215C, 215C are mechanically linked and rotate at the same angular velocity.

In some embodiments, the first gimbal 230A and the second gimbal 230B are mechanically linked. In this embodiment, both gimbals rotate at the same rate but in different directions. For example, if the first gimbal 230A rotates counterclockwise about rotational axis 240 with an angular velocity $\omega_g$, the second gimbal 230B rotates clockwise with the same angular velocity $\omega_g$.

The range of rotation of the gimbals 230 can be limited. In some embodiments, the rotation of the gimbals 230 is limited to 180°. For instance, the angle of rotation of the first gimbal ($\alpha_1$) and the angle of rotation of the second gimbal ($\alpha_2$) can be limited to allow the rotation of the gimbals from −90° to +90°. In some embodiments, the range of the rotation of the gimbals 230 can be mechanically limited. That is, the first CMG 210A and the second CMG 210B can include a stopper that prevents the gimbals 230 from rotation past a threshold angle. In other embodiments, the range of the rotation of the gimbals is limited electronically by the controller actuating the gimbal servos 225.

In another embodiment, the first gimbal 230A is not mechanically linked to the second gimbal 230B. As such, each gimbal 230 can rotate independently in any direction at any angular velocity. In this embodiment, the first gimbal 230A and the second gimbal 230B can be synchronized by an external controller.

Figure 3A:
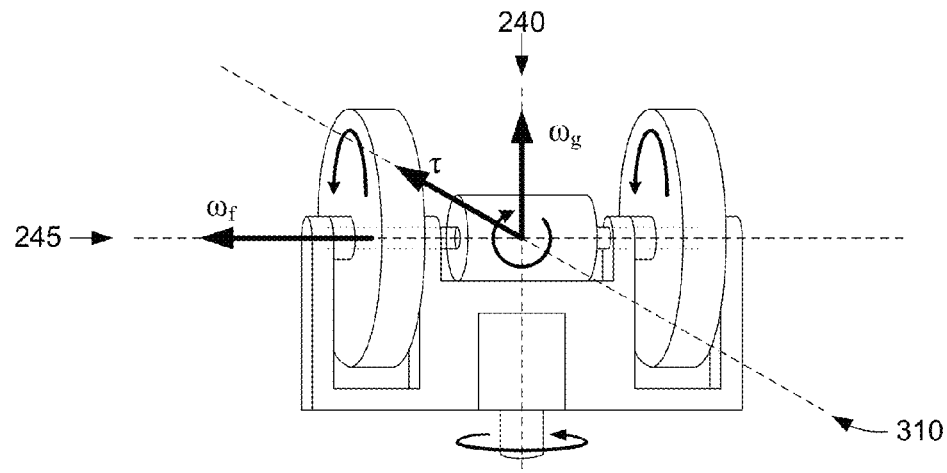
FIG. 3A is a three-dimensional diagram of illustrative forces and momentum generated by a single CMG, in accordance with an embodiment.
Figure 3B:
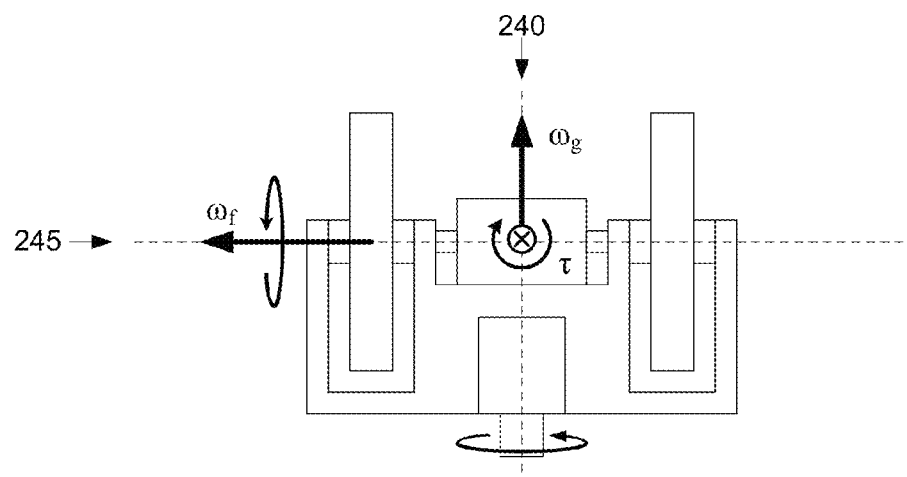
FIG. 3B is a cross sectional diagram of illustrative forces and momentum generated by a single CMG, in accordance with an embodiment.
Figure 3C:
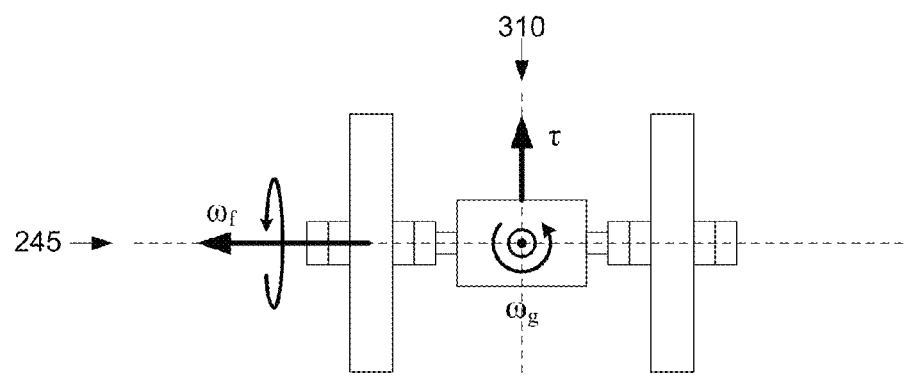
FIG. 3C is a top view diagram of illustrative forces and momentum generated by a single CMG, in accordance with an embodiment.

FIGS. 3A-C are diagrams of the forces and momentum generated by a single CMG, in accordance with an embodiment. FIG. 3A is a three-dimensional view of the CMG, FIG. 3B is a cross sectional view of the CMG, and FIG. 3C is a top view of the CMG. In the CMG of FIGS. 3A-C, flywheels 215A and 215B are rotating counterclockwise as seen from left to right. As such, the angular velocity vector ($\vec{\omega_f}$) of both flywheels point to the left along axis 245. If the servo 225 is actuated to rotate the gimbal counterclockwise as seen from top to bottom (i.e., with an angular velocity vector $\vec{\omega}_g$) pointing up along axis 240 as seen in the views of FIG. 3A and 3B, and pointing out of the figure as seen in the view of FIG. 3C), a torque that tries to rotate the CMG in a clockwise direction (i.e., with a vector $\vec{\tau}$ pointing into the figure along axis 310 as seen in the views of FIGS. 3A and 3B, and pointing up along axis 310 as seen in the view of FIG. 3C) is generated. The torque generated is given by:

$$\vec{\tau} = I_f \vec{\omega}_f \times \vec{\omega}_g \quad (1)$$

Where $I_f$ is the moment of inertia of the flywheels 215, $\omega_f$ is the angular velocity of the flywheels 215, and $\omega_g$ is the angular velocity of the gimbal.

Since the torque ($\tau$) is the cross product of the angular velocity of the flywheel ($\omega_f$) and the angular velocity of the gimbal ($\omega_g$), $\tau$ is perpendicular to both $\omega_f$ and $\omega_g$. As such, the generated torque is along the plane of rotation of the flywheels and the plane of rotation of the gimbals.

Figures 4A, 4B:
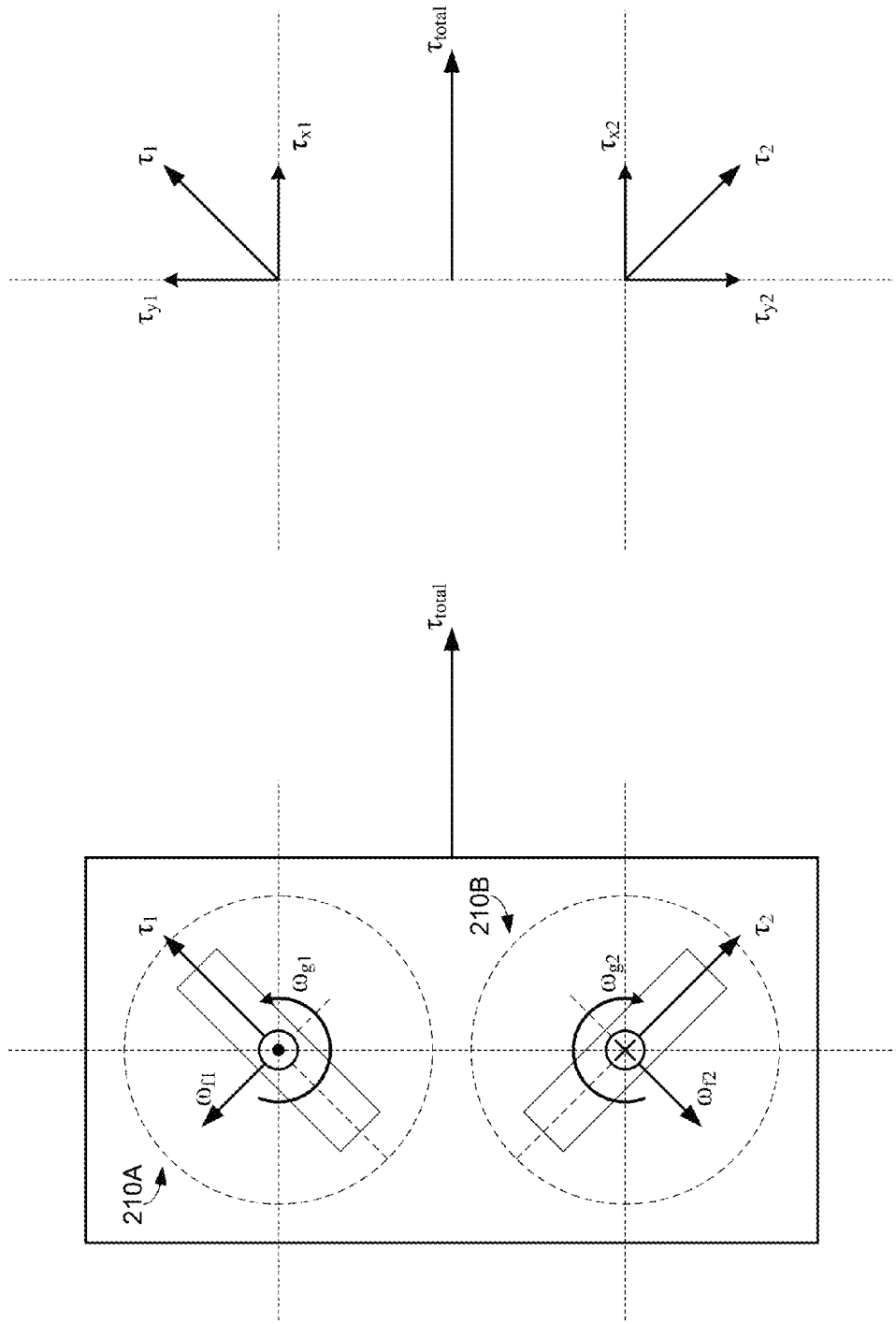
FIG. 4A is a top view diagram of illustrative momentum generated by the exemplary SP-CMG, in accordance with an embodiment.
FIG. 4B is a diagram of illustrative momentum generated by the exemplary SP-CMG, in accordance with an embodiment.

FIGS. 4A-B illustrate the torques generated when two CMGs are configured as a scissor pair. The first CMG 210A is configured to have a flywheel angular velocity $\omega_{f1}$ and the second CMG 210B is configured to have a flywheel angular velocity $\omega_{f2}$. Both $\omega_{f1}$ and $\omega_{f2}$ have approximately the same magnitude, but different direction. When the first CMG 210A is rotated counterclockwise with an angular velocity of $\omega_{g1}$, a torque $\tau_1$ is generated. When the second CMG 210B is rotated clockwise with an angular velocity of $\omega_{g2}$, a torque $\tau_2$ is generated. In one embodiment, the rotation of the CMG 210A and the rotation of the second CMG 210B are synchronized. That is, the rotation of the first CMG 210A and the second CMG 210B start and end at approximately the same time. Additionally, the first CMG 210A and the second CMG 210B are rotated with the same (or substantially the same) angular speed (i.e., same magnitude of the angular velocities). Alternatively, the CMG 210A, 210B can be operated independently with independent start times, stop times, and speed. The total torque $\tau_{total}$ experienced by the SP-CMG is obtained by adding both torques $\tau_1$ and $\tau_2$. If $\omega_{g2}$ and $\omega_{g2}$ have the same magnitude, but different direction, the torques in the vertical direction (i.e., the torques that try to rotate the SP-CMGs in the transverse plane) cancel out and the resulting torque $\tau_{total}$ is in the horizontal direction (i.e., the resulting torque $\tau_{total}$ tries to rotate the SP-CMG in the sagittal plane). That is:

$$\tau_{y1} + \tau_{y2} = 0$$

$$\tau_{total} = \tau_{x1} + \tau_{x2}$$

The generated torque is transferred to a user wearing the SP-CMG 200 for assisting the balance of the user. The generated torque can be transferred to the user via a harness or straps attached to the SP-CMG 200, or via a backplate supporting the SP-CMG. The generated torque applies a rotational force to the trunk of a user wearing the SP-CMG.

Design Considerations

Since the SP-CMG is used in the assistance of human balance, there is a limitation in the size and weight of the SP-CMG. For instance, the SP-CMG should be light enough to be able to be carried as a backpack. In one embodiment, the mass of the SP-CMG does not exceed 9 kg. Additionally, the size of the SP-CMG should be small enough to be comfortably carried by the user. In one embodiment, the radius of the flywheel does not exceed 50 mm. Furthermore, the angular velocity of the flywheels can also be limited due to safety reasons. For instance, the angular velocity of the flywheels can be limited to 5000 rpm.

In some embodiments, the SP-CMG is designed to provide at least 25 Nm of torque. As described in conjunction with equation (1), the torque of the SP-CMG is proportional to the moment of inertia of the flywheels $I_f$, the angular velocity of the flywheels $\omega_f$, and the angular velocity of the gimbal $\omega_g$. For a circular flywheel, the moment of inertia $I_f$:

$$I_f = \frac{1}{2}mr^2 = \frac{1}{2}(\pi r^2 t \rho)r^2 = \frac{\pi}{2}r^4 t \rho \quad (2)$$

Where m is the mass of the flywheels, r is the radius of the flywheels, t is the thickness of the flywheels, and $\rho$ is the material density of the flywheels.

In some embodiments, a tungsten based, high-density alloy (e.g., ASTM B777) with a density of at least 18.5 g/cm³ and a yield strength of at least 600 MPa is used for the flywheels. In one embodiment, each flywheel is limited to 0.9 kg, resulting in a total flywheel mass of 3.6 kg. As such, the moment of inertia $I_f$ for the SP-CMG is:

$$I_f = \frac{1}{2} 3.6 \text{ kg} \times (0.05 \text{ m})^2 = 0.0045 \text{ kg} \cdot \text{m}^2$$

Figure 5:
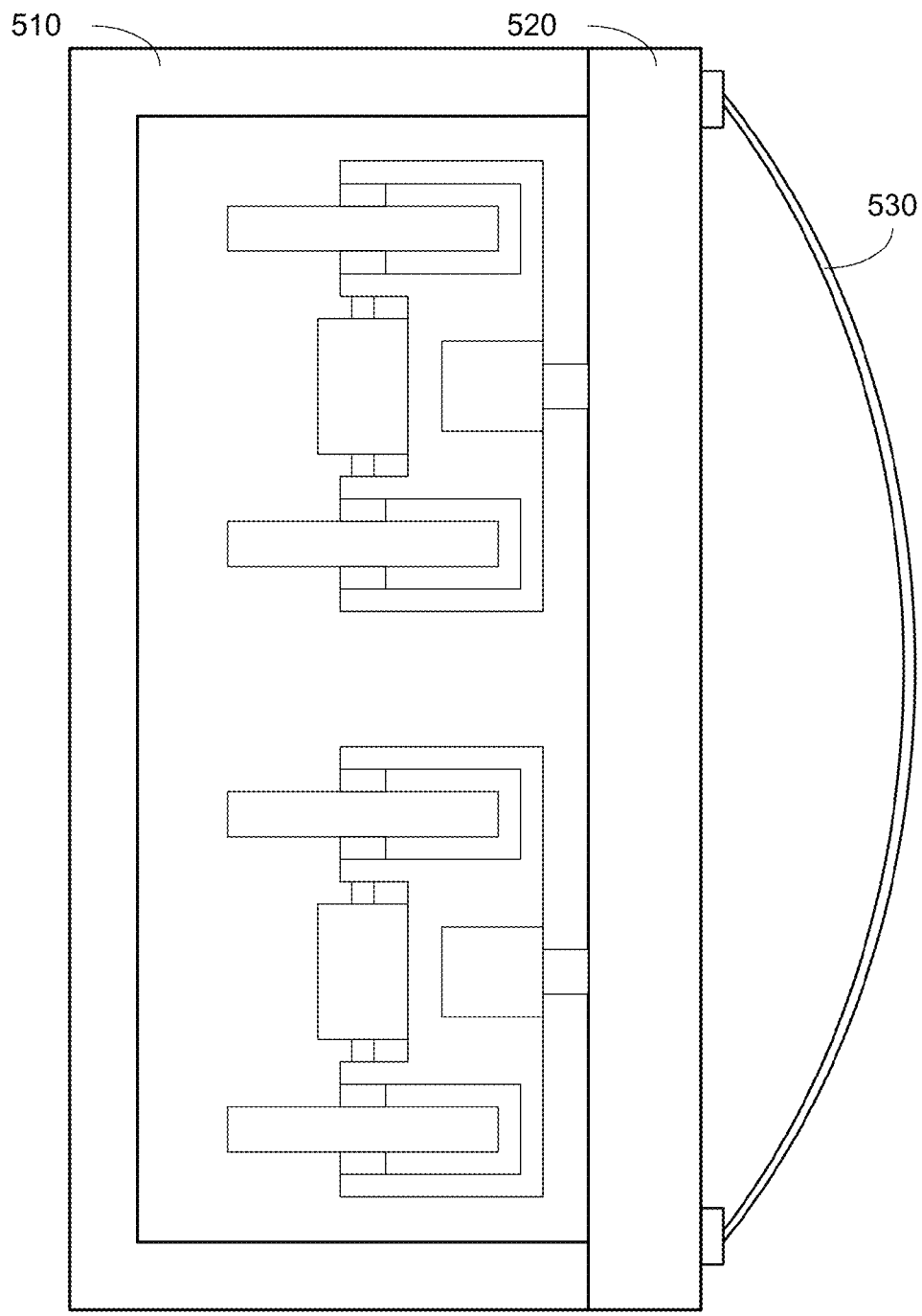
FIG. 5 illustrates an illustrative chassis for enclosing the exemplary SP-CMG, in accordance with an embodiment.

To increase safety of the SP-CMG, the SP-CMG is enclosed in a chassis 500, as illustrated in FIG. 5. The chassis includes a thick back plate 520, a case 510, and a harness 530. In some embodiments, the back plate 520 is at least 5 mm thick. The back plate 520 can, for example, be made of a high strength and lightweight material, such as 7075-T6 aluminum. The back plate protects the user of the SP-CMG in the event the SP-CMG fails. The case 510 can be made of a lightweight material, such as carbon-Kevlar. In some embodiment, the case 510 is thinner than the back plate 520. For instance, the case 510 can be 3 mm thick. The case 510 protects the user as well as other people in the vicinity of the user in the event the SP-CMG fails.

ID Harness 530 allows the user to wear the SP-CMG as a back pack. For instance, a four point harness can be used to provide a secure and rigid connection between the SP-CMG and the user.

Operation of the SP-CMG

Figure 6:
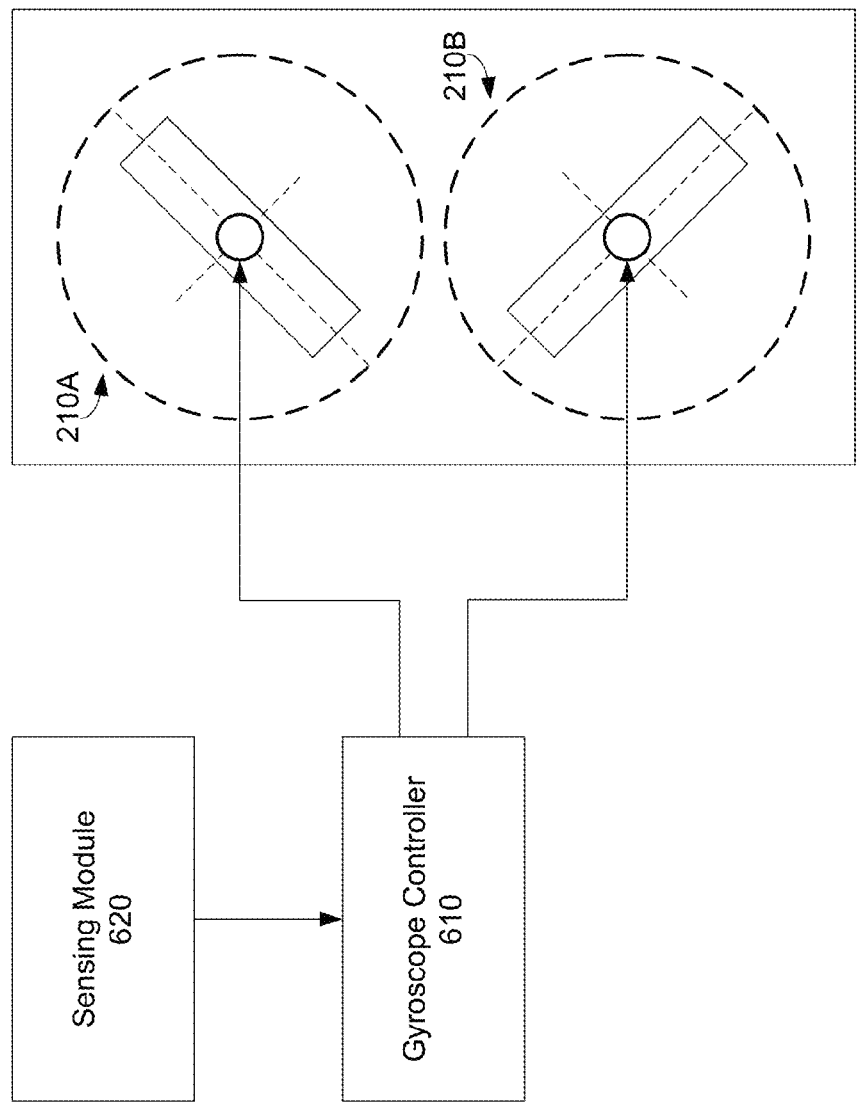
FIG. 6 is a block diagram of an illustrative control system of the exemplary SP-CMG, in accordance with an embodiment.
Figure 7:
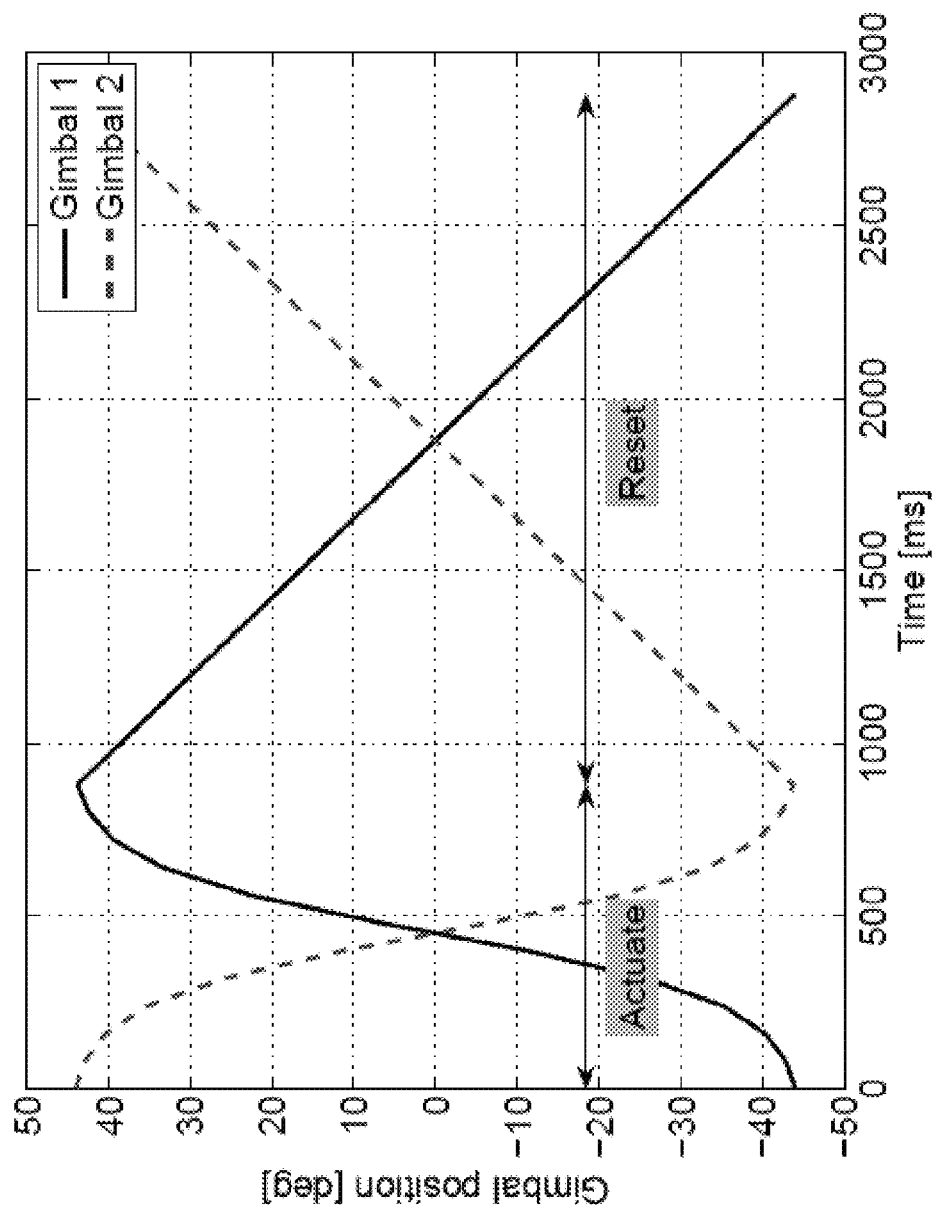
FIG. 7 is an illustrative timing diagram of a position of gimbals of the exemplary SP-CMG, in accordance with an embodiment.

FIG. 6 illustrates a block diagram of the control system of the SP-CMG. The control system includes a gyroscope controller 610 and a sensing module 620. The sensing module 620 can include one or more accelerometers and/or gyroscopes. For instance, the sensing module 620 can include a three-axis accelerometer for measuring acceleration in the x, y, and z axis. In another example, the sensing module 620 also includes a three axis gyroscope for sensing the extent and rate of rotation in space (e.g., roll, pitch, and yaw). The sensing module 620 detects the acceleration of the user and sends a signal to the gyroscope controller 610 to actuate the gimbal servos 225. FIG. 7 illustrates a timing diagram for the position of the gimbals. When the gyroscope controller receives a signal to actuate the servos 225, the gyroscope controller independently controls the gimbal servo of the first CMG and the gimbal servo of the second CMG.

Having independently controlled CMGs reduces the complexity of the mechanical structure of the SP-CMG. As such, the total mass of the SP-CMG can be reduced. In addition, the CMGs can be actuated in a non-synchronized manner to generate torques that applies a rotational force to the user wearing the SP-CMG in planes other than the sagittal plane.

In some embodiments, as illustrated in FIG. 7, the gimbals are kept at a 45° angle during their idle state. The rotation of the gimbals is divided into two phases, an actuate phase and a reset phase. During the actuate phase, the gimbals are rotated to provide a torque to the user. During the reset phase, the gimbals are rotated back to the idle position. During the actuate phase, the gimbal servos 225 are actuated to rotate the gimbals 230 90°. In one embodiment, the angular velocities of the gimbals are increased as the gimbal positions approach 0°, and are decreased after the gimbal positions pass 0°. The gimbal servos 225 can be actuated with a low angular speed at the beginning of the actuate phase and the angular speed of the actuators can be increased as the gimbals approach the midpoint of the actuate phase. Actuating the gimbal servos 225 with a low angular speed at the beginning of the actuate phase reduces the likelihood of damaging the gimbal servos. In some embodiments, during the actuate phase, the gimbals are rotated more or less than 90°. For instance, the amount and speed of the rotations of the gimbals is proportional to an acceleration sensed by the sensing module 620.

During the reset phase, the gimbals are slowly rotated back to the idle position. In some embodiments, the gimbals are rotated with an angular velocity that generates a torque less than a threshold value. For instance, in the exemplary diagram of FIG. 7, during the actuate phase, the first gimbal 210 is rotated from −45° to 45° and the second gimbal is rotated from 45° to −45° in 880 ms and a maximum angular speed of 267°/s. During the reset phase, the first gimbal is rotated from 45° back to −45° and the second gimbal is rotated from −45° back to 45° in 2000 ms with an angular speed of 44°/s. By resetting the gimbals over a long period of time, the torque generated by the resetting of the gimbals is imperceptible or almost imperceptible to the user wearing the SP-CMG. As such, a torque that can disrupt the balance of the user wearing the SP-CMG is not generated.

In the embodiment of FIG. 7, the gimbals of the first and second CMGs are rotated with the same angular speed. In this embodiment the torque that tries to rotate the SP-CMG in the transverse plane is cancelled out. In other embodiments, the gimbals of the first and second CMGs are rotated with different angular velocities. In this embodiment, the CMG generates a torque that tries to rotate the SP-CMG in both the sagittal and the transverse plane.

In some embodiments, at the end of the actuate phase, and before the reset phase, the gyroscope controller 610 slows down the flywheels 215 to generate an additional torque. The additional torque obtained can be given by:

$$\tau = I_f \dot{\omega}_f \quad (3)$$

Where $\dot{\omega}_f$ is the rate of change of the angular velocity of the flywheels (i.e., the deceleration of the flywheels). In some embodiments, the flywheels 215 are only slowed down when the flywheels 215 are rotating in the sagittal plane. In one embodiment, the flywheels of each CMG are slowed down independently. In another embodiment, the flywheels of both the first CMG 210A and the second CMG 210B are slowed down at the same rate.

In some embodiments, instead of being divided into an actuate phase and a reset phase, the gimbals are actuated to actively apply forces to keep the trunk of the user in an upright position. When the sensing module 620 senses that the trunk of the user has deviated from the upright position, a signal is sent to the gyroscope controller 610 and the gyroscope controller 610 actuates the gimbal servos 225 to generate a torque that applies a force to restore the trunk of the user to the upright position. In this embodiment, the range of the rotations of the gimbals can be shorter since a smaller amount of torque can be needed to restore the trunk of the user to the upright position. Additionally, the gimbals can be rotated in any direction, depending on the direction of the deviation of the trunk of the user. If the user leans forward, the gimbals are rotated to generate a torque to pull the back of the user; and if the user leans backwards, the gimbals are rotated to generate a torque that pushes the back of the user. In between actuations of the gimbals, the gimbals can be reset to a center position using a relatively slow rotational speed so that the user does not feel any substantial torque during the reset period.

Additional Alternative Embodiments

Upon reading this disclosure, those of skill in the art will appreciate still additional alternative designs having the features described herein. Thus, while particular embodiments and applications have been illustrated and described, it is to be understood that the embodiments are not limited to the precise construction and components disclosed herein and that various modifications, changes and variations which will be apparent to those skilled in the art can be made in the arrangement, operation and details of the embodiments disclosed herein without departing from the spirit and scope of the embodiments as defined in the appended claims.

What is claimed is:

1. An apparatus for human balance assist, comprising:
a scissor-pair control moment gyroscope (SP-CMG) comprising:
a first control moment gyroscope (CMG), comprising:
a first flywheel and a second flywheel each rotatable about a first axis of rotation,
a first motor that when active rotates the first and second flywheels about the first axis of rotation,
a first gimbal comprising a first shaft and a first support structure supporting the first flywheel and the second flywheel, the first gimbal rotatable about a second axis of rotation through the first shaft, and
a first gimbal servo that when active rotates the first gimbal about the second axis of rotation; and
a second CMG, comprising:
a third flywheel and a fourth flywheel each rotatable about a third axis of rotation,
a second motor that when active rotates the third and fourth flywheels about the third axis of rotation,
a second gimbal comprising a second shaft and a second support structure supporting the third flywheel and the fourth flywheel, the second gimbal rotatable about a fourth axis of rotation through the second shaft, and
a second gimbal servo that when active rotates the second gimbal about the fourth axis of rotation; and
a gyroscope controller, the gyroscope controller controlling the first gimbal servo and the second gimbal servo, wherein the gyroscope controller further actuates the first gimbal servo in a first direction, and actuates the second gimbal servo in a second direction opposite the first direction.

2. The apparatus of claim 1, wherein the first motor rotates the first and second flywheels with a first angular speed, and wherein the second motor rotates the third and fourth flywheels with the first angular speed.

3. The apparatus of claim 2, wherein the first and second flywheels are coupled by a third shaft, and the third and fourth flywheels are coupled by a fourth shaft.

4. The apparatus of claim 2, wherein the first angular speed is below one fifth of an angular speed at which the flywheels are subject to a strain substantially equal to a strain rating of a material used to fabricate the flywheels.

5. The apparatus of claim 2, wherein the first motor rotates the first and second flywheel in a third direction, and wherein the second motor rotates the third and fourth flywheels in a fourth direction opposite of the third direction.

6. The apparatus of claim 1, further comprising:
a sensing module to sense an acceleration of a trunk of a user of the apparatus, and send a signal to the gyroscope controller based on the sensed acceleration, wherein the signal sent by the sensing module to the gyroscope controller is proportional to the sensed acceleration; and
wherein the gyroscope controller further actuates the first gimbal in the first direction, and actuates the second gimbal in the second direction responsive to receiving the signal from the sensing module, wherein the angular speed of the first and second gimbals is proportional to the received signal.

7. The apparatus of claim 6, wherein the sensing module sends the signal to the gyroscope controller responsive to the sensed acceleration being larger than a threshold value.

8. The apparatus of claim 1, further comprising:
a backplate, wherein the first and second gimbals are substantially perpendicular to a first surface of the backplate;
an enclosure coupled to the back plate; and
a harness coupled to a second surface the back plate.

9. The apparatus of claim 1, wherein each of the first, second, third, and fourth flywheel weigh 900 grams or less and has a radius of 50 mm or less, wherein the apparatus weighs 9 kg or less, and wherein the first and second CMGs produce 25 Nm of torque or more.

10. The apparatus of claim 1, wherein the first, second, third and fourth flywheels are made of a tungsten based, high-density alloy and the enclosure is made of carbon-Kevlar.

11. The apparatus of claim 1, wherein:
the first flywheel and the second flywheel are equidistant to an axis of rotation of the first gimbal;
a center of mass of the first motor is located on the axis of rotation of the first gimbal;
the third flywheel the fourth flywheel are equidistant to an axis of rotation of the second gimbal; and
a center of mass of the second motor is located on the axis of rotation of the second gimbal.

12. The apparatus of claim 1, wherein the rotation of the first gimbal of the SP-CMG and the rotation of the second gimbal of the SP-CMG are controlled independently from each other electronically.

13. A method for controlling a scissor-pair control moment gyroscope (SP-CMG) comprising:
rotating a first plurality of flywheels of the SP-CMG with a first angular velocity, and rotating a second plurality of flywheels of the SP-CMG with a second angular velocity, the first plurality of flywheels rotatable about a first axis of rotation, the second plurality of flywheels rotatable about a second axis of rotation, the first plurality of flywheels supported by a first gimbal rotatable about a third axis and comprising a first shaft and a first support structure, and the second plurality of flywheels supported by a second gimbal rotatable about a fourth axis and comprising a second shaft and a second support structure; and
rotating a first gimbal servo of the SP-CMG at a first direction and a second gimbal servo of the SP-CMG at a second direction, opposite of the first direction, the first gimbal servo, when active, rotates the first gimbal to rotate about the third axis, and the second gimbal servo, when active, rotates the second gimbal to rotate about the fourth axis.

14. The method of claim 13, wherein a magnitude of the first angular velocity and a magnitude of the second angular velocity are substantially equal.

15. The method of claim 13, wherein the first gimbal servo and the second gimbal servo are rotated with a substantially equal angular speed.

16. The method of claim 13, further comprising:
sensing an acceleration of a trunk of a user; and
wherein an angular speed of the first gimbal servo and an angular speed of the second gimbal servo are proportional to the sensed acceleration.

17. The method of claim 13, wherein the first gimbal is rotated at the first direction with a first gimbal angular speed, and the second gimbal is rotated at the second direction with a second gimbal angular speed and further comprising:
rotating the first gimbal with a third gimbal angular speed at a third direction, and rotating the second gimbal with a fourth gimbal angular speed at a fourth direction, wherein the third and fourth gimbal angular speeds are smaller than the first and second gimbal angular speed and wherein the third direction is opposite to the first direction and the fourth direction is opposite to the second direction.

* * * * *